(12) United States Patent
Hirano et al.

(10) Patent No.: US 8,420,403 B2
(45) Date of Patent: Apr. 16, 2013

(54) METHOD FOR EVALUATING CAKING PROPERTY OF SODIUM HYDROGENCARBONATE CRYSTAL PARTICLES

(75) Inventors: Hachirou Hirano, Ichihara (JP); Takako Hirano, legal representative, Chiba (JP); Shintaro Kikuchi, Ibaraki (JP); Fumiaki Nakashima, Ibaraki (JP); Hisakazu Arima, Ibaraki (JP); Shigeru Sakurai, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 1606 days.

(21) Appl. No.: 11/619,286

(22) Filed: Jan. 3, 2007

(65) Prior Publication Data

US 2007/0105226 A1 May 10, 2007

Related U.S. Application Data

(63) Continuation of application No. PCT/JP2005/012104, filed on Jun. 30, 2005.

(30) Foreign Application Priority Data

Jun. 30, 2004 (JP) ................................. 2004-194540
Aug. 30, 2004 (JP) ................................. 2004-250749

(51) Int. Cl.
*G01N 33/00* (2006.01)
(52) U.S. Cl.
USPC ............................ 436/145; 436/139; 423/422
(58) Field of Classification Search .................. None
See application file for complete search history.

(56) References Cited

U.S. PATENT DOCUMENTS

2003/0211027 A1 11/2003 Yokoyama et al.

FOREIGN PATENT DOCUMENTS

EP   0 719 715 A1   7/1996
EP   1 104 804 A1   6/2001

(Continued)

OTHER PUBLICATIONS

Irani, R.R., et al. Flow Conditioning and Anticaking Agents, 1959, Industrial and Engineeing Chemistry, vol. 51(10), p. 1285-1288.*

(Continued)

*Primary Examiner* — Robert Xu
(74) *Attorney, Agent, or Firm* — Oblon, Spivak, McClelland, Maier & Neustadt, L.L.P.

(57) ABSTRACT

A method for evaluating the caking property of sodium hydrogencarbonate crystal particles, characterized in that sodium hydrogencarbonate crystal particles are hermetically sealed in a packaging material having a water vapor transmission rate of at least 3 g/(m²·24 h) (at 40° C. with a relative humidity difference of 90%) as stipulated in JIS K7129 and left at rest at a temperature of from 17 to 35° C. at a carbon dioxide gas concentration of from 0.03 to 0.05 vol % at a relative humidity of from 40 to 95% for from 2 weeks to 3 months, and the proportion of agglomerated sodium hydrogencarbonate crystal particles is determined to evaluate the caking tendency. A novel test method for evaluating the caking property of sodium hydrogencarbonate crystal particles, capable of providing results of the caking property test with high reproducibility, quantitatively with high versatility, can be provided.

23 Claims, 1 Drawing Sheet

FOREIGN PATENT DOCUMENTS

| | | |
|---|---|---|
| EP | 1 357 085 A2 | 10/2003 |
| EP | 1 357 085 A3 | 10/2003 |
| JP | 4-270113 | 9/1992 |
| JP | 5-58622 | 3/1993 |
| JP | 3306873 | 5/2002 |
| JP | 2003-83947 | 3/2003 |
| JP | 2003-104722 | 4/2003 |
| JP | 2004-2166 | 1/2004 |
| JP | 2004-203673 | 7/2004 |

OTHER PUBLICATIONS

Janpan Climate, retrieved from internet http://www.climatetemp.info/japan/.*

M. Kuniyoshi, et al., "Stability of Various Phases Produced on Surface of Sodium Bicarbonate", Journal of the Mining and Materials Processing Institute of Japan, vol. 118, 2002, pp. 756-764.

Japanese Industrial Standard, Testing methods for water vapor transmission rate of plastic film and sheeting (instrument method) 1992.

* cited by examiner

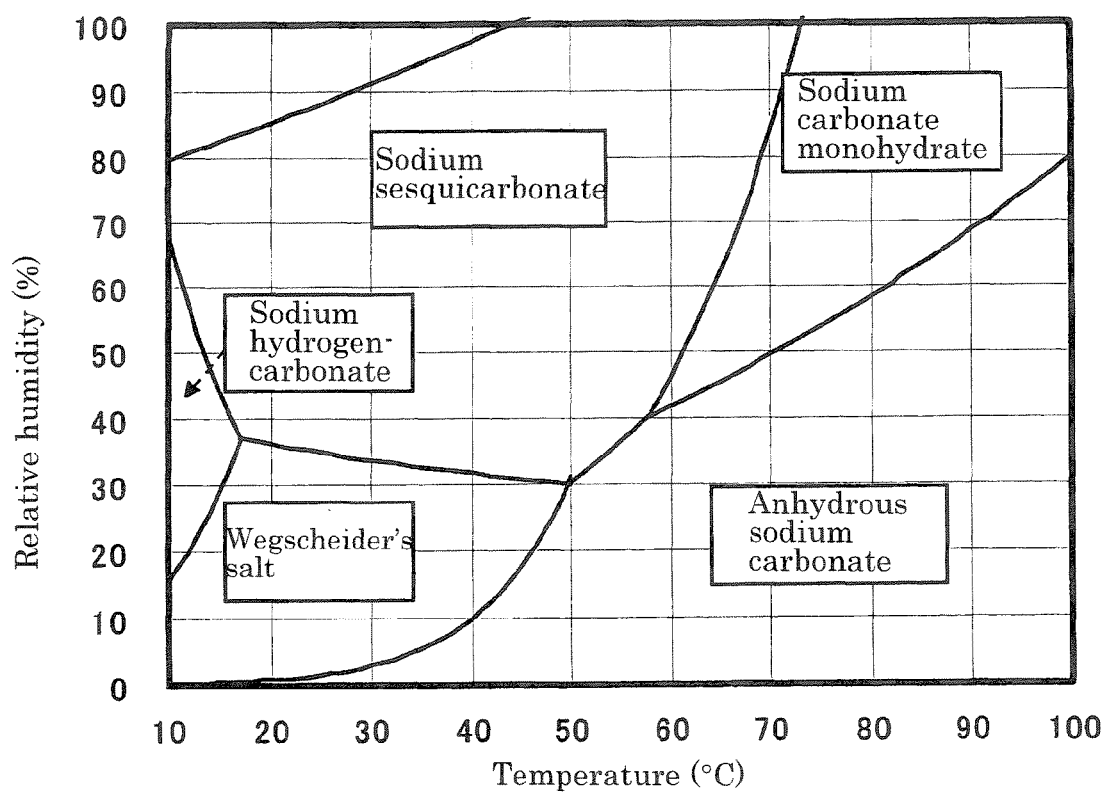

METHOD FOR EVALUATING CAKING PROPERTY OF SODIUM HYDROGENCARBONATE CRYSTAL PARTICLES

TECHNICAL FIELD

The present invention relates to a novel method for evaluating the caking property of sodium hydrogencarbonate crystal particles.

BACKGROUND ART

Heretofore, sodium hydrogencarbonate (NaHCO$_3$ which is also called baking soda or sodium bicarbonate) is widely used in the field of various food products, as baking powder, an additive for soft drinks, etc., in the pharmaceutical industry as a dialysate, an antacid, etc., and further as a fire-extinguishing agent, as a bath additive, as a detergent, as a blasting medium, as an acidic gas neutralizing agent, etc. In most cases, such sodium hydrogencarbonate is produced, transported, stored, sold and used in the form of powdery or granular crystal particles.

However, commercial crystal particles of sodium hydrogencarbonate generally show a caking property and is empirically known to have a caking property resulting from a very small amount of anhydrous sodium carbonate, sodium carbonate monohydrate or Wegscheider's salt, formed on the surface of the sodium hydrogencarbonate crystal particles by drying in the production process, especially in a storage environment with a high humidity such as in the rainy season. If caking occurs, the flowability of the particles will be low, and the handling efficiency will deteriorate remarkably in the respective steps from distribution to use, and various troubles are likely to be brought about. Thus, the caking is a serious problem which may impair the commercial value of sodium hydrogencarbonate.

However, heretofore, it has been very difficult to quantitatively determine whether the sodium hydrogencarbonate crystal particles are practically caked during storage or not in a short period of time with high reproducibility. For example, Patent Document 1 discloses a test for evaluating the caking property by storing a sample of sodium hydrogencarbonate crystal particles at a temperature of 30° C. at a relative humidity of 80% for 1 week. However, under such conditions, the period is short and the caking phenomenon which will occur in the rainy season is not accurately reproduced, and this test is inappropriate as an evaluation method. Further, the method is not a quantitative evaluation method wherein the mass or the volume is weighed, and the method is not to package a certain amount, whereby agglomerates resulting from the caking can not be quantitatively measured, such being poor in reproducibility.

Further, Patent Document 2 discloses a test for evaluating the caking which comprises storing a sample of sodium hydrogencarbonate crystal particles at a temperature of 30° C. at a relative humidity of 80% for one day, storing it at a temperature of 20° C. at a relative humidity of 50% for one day in addition, and repeatedly carrying out these storages alternately for three weeks. However, in such an evaluation method under these conditions also, the caking phenomenon which will occur in the rainy season is not practically reproduced, similar to the Patent Document 1, and this test is inappropriate as an evaluation method. For example, even when the change in the temperature between 30° C. and 20° C. is considered as a difference between day and night, as the relative humidity in the interior of the bag will increase when the temperature is decreased at night, the test conditions are opposite to a phenomenon which practically occurs. Further, the material or the laminate structure of the packaging material is also not disclosed. Therefore, accurate reproduction is impossible.

Patent Document 3 discloses an evaluation method under such conditions that five packaging bags each having 25 kg of sodium hydrogencarbonate crystal particles packed therein are piled up and stored at 25° C. for 4 weeks under pressure, but it does not disclose the relative humidity. Further, Patent Document 4 discloses a method for evaluating the caking property under similar conditions. These conventional tests for evaluating the caking, evaluation conditions of which are not sufficiently disclosed, or the evaluation method of which is not a quantitative method, are poor in reproducibility.

As mentioned above, in a case where the test for evaluating the caking property is poor in the reproducibility and is poor as a quantitative method, the results of the evaluation test are poorly reliable and further, in a case where there are two or more samples to be compared, the test for evaluating the caking property should be simultaneously conducted. That is, it is difficult to compare results of the tests for evaluating the caking property carried out in separate times at separate locations, and the results of the caking property evaluation test have very low versatility for the later utilization of the data.

Further, with respect to pharmaceuticals, Guideline for Stability Testing of New Drug Substances and Products by Ministry of Health, Labour and Welfare (PMSB/ELD Notification No. 0603001) may be mentioned. Conditions for stability evaluation employed here are such that the temperature is 25° C. or 30° C. and the relative humidity is 60%, and the temperature is 40° C. and the relative humidity is 75%. Under these conditions, if employed as conditions for the method for evaluating the caking property of sodium hydrogencarbonate crystal particles, the period is so long as 12 months or 6 months, and the evaluation takes too long, and a temperature of 40° C. corresponds to a condition under which sodium hydrogencarbonate itself is likely to be decomposed, and such conditions are significantly different from a state in which caking practically occurs. Thus, no results of tests on caking with high reproducibility will be obtained in a short period of time.

Patent Document 1: Japanese Patent No. 3306873
Patent Document 2: JP-A-2003-104722
Patent Document 3: JP-A-2004-2166
Patent Document 4: JP-A-2004-203673

DISCLOSURE OF THE INVENTION

Object to be Accomplished by the Invention

Under these circumstances, it is an object of the present invention to provide a novel test method for evaluating the caking property of sodium hydrogencarbonate crystal particles, with high reproducibility quantitatively, capable of measurement in a relatively short time, with high versatility, and capable of providing useful and highly utilizable results of the caking property test.

Means to Accomplish the Object

To accomplish the above object, the present inventors have conducted extensive studies on caking of sodium hydrogencarbonate crystal particles and as a result, found that the caking of sodium hydrogencarbonate crystal particles occurs through the following procedure.

Namely, on the surface of sodium hydrogencarbonate crystal particles, depending upon various conditions such as the temperature, the humidity and the carbon dioxide gas concentration, of a gas in an atmosphere in the drying step, or in a case where the crystal particles are discharged from the drying step, with which the particles are to be in contact, a very small amount of sodium hydrogencarbonate is decomposed into anhydrous sodium carbonate ($Na_2CO_3$), and further converted into sodium carbonate monohydrate ($Na_2CO_3 \cdot H_2O$) or Wegscheider's salt ($Na_2CO_3 \cdot 3NaHCO_3$) and then converted into sodium sesquicarbonate ($Na_2CO_3 \cdot NaHCO_3 \cdot 2H_2O$) during storage in e.g. a warehouse or during delivery. The conversion of anhydrous sodium carbonate into sodium sesquicarbonate via sodium carbonate monohydrate is disclosed in American Chemical Society, monograph series, "MANUFACTURE OF SODA", second edition, Chapter XXIX, Behavior of Soda Ash in Storage, pages 509 to 515 (published by Reinhold Publishing, 1942).

Further, according to the studies by the present inventors, it has been confirmed that caking occurs when, on the surface of sodium hydrogencarbonate crystal particles, anhydrous sodium carbonate is converted into sodium carbonate monohydrate or Wegscheider's salt, or anhydrous sodium carbonate is converted into sodium sesquicarbonate via sodium carbonate monohydrate or Wegscheider's salt. It has been found that relatively weak caking occurs in the former case of conversion of anhydrous sodium carbonate into sodium carbonate monohydrate or Wegscheider's salt, but stronger caking occurs in the latter case of conversion of anhydrous sodium carbonate finally into sodium sesquicarbonate. This is considered to result from crosslinking of the crystals at points where they are in contact, since not only the crystals themselves change but also their volume and mass increase by the above conversion, as shown in the following Table 1. The changes in the volume and the mass of the crystals are more significant when anhydrous sodium carbonate is converted into sodium sesquicarbonate than when anhydrous sodium carbonate is converted into sodium carbonate monohydrate or Wegscheider's salt. This is empirically understood from the fact that the degree of caking is almost in proportion thereto. Further, in a case where the surface of the sodium hydrogencarbonate crystal particles comprises sodium sesquicarbonate, the above conversion will not occur, and accordingly the caking property tends to be low. Which surface composition is formed is selected in accordance with the production process or the cost.

TABLE 1

|  | Anhydrous sodium carbonate | Sodium carbonate monohydrate | Wegscheider's salt | Sodium sesqui-carbonate |
| --- | --- | --- | --- | --- |
| Formula weight | 105.99 | 124.00 | 358.01 | 226.03 |
| Density (g/cm$^3$) | 2.533 | 2.259 | 2.334 | 2.044 |
| Mass (g) per 1 mol of Na | 53.0 | 62.0 | 71.6 | 75.3 |
| Volume (cm$^3$) per 1 mol of Na | 20.9 | 27.4 | 30.7 | 36.9 |

Accordingly, with respect to the degree of caking of the sodium hydrogencarbonate crystal particles, the caking tends to be stronger when anhydrous sodium carbonate is converted into sodium sesquicarbonate than when anhydrous sodium carbonate is converted into sodium carbonate monohydrate or Wegscheider's salt. Therefore, it is understood that for evaluation of the caking property of the sodium hydrogencarbonate crystal particles, a caking evaluation test under conditions where sodium sesquicarbonate is formed is essential.

In the meantime, the present inventors have conducted experiments and thermodynamic studies in detail and as a result, they have found that the boundary between sodium carbonate monohydrate and sodium sesquicarbonate is in relation as shown in FIG. 1 at a carbon dioxide gas concentration of 0.04 vol % in the air. Namely, it is required that a sample to be subjected to measurement is left at rest in a region of sodium sesquicarbonate as shown in FIG. 1. The range of the region is such that the temperature is from 17 to 35° C. and the relative humidity is from 40 to 95%.

It was found that the above conversion of sodium carbonate monohydrate into sodium sesquicarbonate occurs similarly at a carbon dioxide gas concentration of from 0.03 to 0.05 vol % Therefore, in the present invention, reproducible, quantitative and versatile results of the caking test were successively obtained in such a manner that sodium hydrogencarbonate crystal particles of which the caking property is to be evaluated are left at rest under conditions where sodium sesquicarbonate will be stably formed for a predetermined relatively short time, and the proportion of agglomerated sodium hydrogencarbonate crystal particles is obtained.

Further, the present inventors have found that good results of the caking test can be obtained by hermetically sealing sodium hydrogencarbonate crystal particles of which the caking property is to be evaluated in a packaging material so that the bulk density is from 0.2 to 0.7 time the true density, followed by still standing.

Thus, the present invention is based on the above-described novel discoveries, and provides the following.

(1) A method for evaluating the caking property of sodium hydrogencarbonate crystal particles, characterized in that sodium hydrogencarbonate crystal particles are hermetically sealed in a packaging material having a water vapor transmission rate of at least 3 g/(m$^2$·24 h) (at 40° C. with a relative humidity difference of 90%) as stipulated in JIS K7129 and left at rest at a temperature of from 17 to 35° C. at a carbon dioxide gas concentration of from 0.03 to 0.05 vol % at a relative humidity of from 40 to 95% for from 2 weeks to 3 months, and the proportion of agglomerated sodium hydrogencarbonate crystal particles is determined to evaluate the caking tendency.

(2) The method for evaluating the caking property of sodium hydrogencarbonate crystal particles according to the above (1), wherein the sodium hydrogencarbonate crystal particles have at least one member selected from the group consisting of anhydrous sodium carbonate, sodium carbonate monohydrate, Wegscheider's salt and sodium sesquicarbonate on their surface.

(3) The method for evaluating the caking property of sodium hydrogencarbonate crystal particles according to the above (1) or (2), wherein the sodium hydrogencarbonate crystal particles are hermetically sealed in the packaging material so that the bulk density is from 0.2 to 0.7 time the true density, and left at rest.

(4) The method for evaluating the caking property of sodium hydrogencarbonate crystal particles according to any one of the above (1) to (3), wherein the temperature at which the crystal particles are left at rest is from 20 to 29° C.

(5) The method for evaluating the caking property of sodium hydrogencarbonate crystal particles according to any one of the above (1) to (4), wherein the time period over which the crystal particles are left at rest is from 3 weeks to 2 months.

Effects of the Invention

According to the present invention, a novel method for evaluating the caking property of sodium hydrogencarbonate crystal particles, with high reproducibility quantitatively, capable of measurement in a relatively short time, with high versatility, and capable of providing results of the caking property test, is provided for the first time. The reason why such quantitative results of the caking test with high reproducibility with versatility can be obtained by the method for evaluating the caking property of the present invention is that the conditions when the sodium hydrogencarbonate crystal particles are left at rest, under which sodium sesquicarbonate most responsible for the caking will be surely formed on the surface of the crystal particles, are set considering the change in humidity in the interior of the bag immediately after being left at rest.

BRIEF DESCRIPTION OF THE DRAWING

FIG. 1 is an equilibrium diagram of anhydrous sodium carbonate, sodium carbonate monohydrate, sodium sesquicarbonate and Wegscheider's salt in a case where the carbon dioxide gas concentration is 0.04 vol %, which illustrates conditions under which sodium hydrogencarbonate crystal particles are left at rest of the present invention.

BEST MODE FOR CARRYING OUT THE INVENTION

The sodium hydrogencarbonate crystal particles of which the caking property is to be evaluated in the present invention has, for example, on their surface, at least one member selected from the group consisting of anhydrous sodium carbonate, sodium carbonate monohydrate, Wegscheider's salt and sodium sesquicarbonate in many cases. The surface of the sodium hydrogencarbonate crystal particles has a composition of anhydrous sodium carbonate, sodium carbonate monohydrate, Wegscheider's salt, sodium sesquicarbonate or a mixture thereof, by drying at the time of production and subsequent changes. Particularly, the surface of the sodium hydrogencarbonate crystal particles immediately after production has a composition comprising anhydrous sodium carbonate, and sodium carbonate monohydrate and/or Wegscheider's salt. Then, during storage in a warehouse or the like or during delivery, the composition changes to sodium sesquicarbonate.

In the meantime, the caking tendency of the sodium hydrogencarbonate crystal particles varies depending upon the surface state i.e. the proportions of anhydrous sodium carbonate, sodium carbonate monohydrate, Wegscheider's salt and sodium sesquicarbonate on the surface, and in the method of the present invention, this caking property is evaluated.

The sodium hydrogencarbonate crystal particles of which the caking property is to be evaluated in the present invention may have any average particle size, but the present invention is effective within a range of the average particle size of from 50 to 500 μm, preferably from 70 to 300 μm. If the average particle size exceeds 500 μm, the influence of the mass of the crystal particles tends to be significant, and caking is likely to disintegrate by the gravity. Further, if it is smaller than 50 μm, particles tend to agglomerate by the influence of the force between particles such as Van der Waals force, and the number of sites at which the particles are in contact with one another per unit volume of the powder layer tends to increase, whereby the crystal particles inherently tend to be caked. Here, the average particle size is an average particle size based on the mass, and is defined as the 50% particle size in the cumulative particle size distribution based on the mass obtained by a sieving method. Specifically, measurement is carried out by means of a Ro-Tap shaker and a sieving method (hereinafter referred to simply as a sieving method) as stipulated in JIS Z 8801-1.

In the test for evaluating the caking property of sodium hydrogencarbonate crystal particles of the present invention, sodium hydrogencarbonate crystal particles to be subjected to evaluation are hermetically sealed in a packaging material having a water vapor transmission rate of at least 3 g/(m$^2$·24 h) (at 40° C. with a relative humidity difference of 90%) as stipulated in JIS K 7129 and left at rest at a temperature of from 17 to 35° C. at a carbon dioxide concentration of from 0.03 to 0.05 mol % at a relative humidity of from 40 to 95% for from two weeks to three months. Then, the proportion of agglomerated sodium hydrogencarbonate crystal particles is determined to evaluate the caking tendency.

FIG. 1 is an equilibrium diagram of sodium hydrogencarbonate, anhydrous sodium carbonate, sodium carbonate monohydrate, Wegscheider's salt and sodium sesquicarbonate in a case where the carbon dioxide gas concentration is 0.04 vol % to illustrate the above conditions under which the crystal particles are left at rest. Regions in which anhydrous sodium carbonate, sodium carbonate monohydrate, Wegscheider's salt, sodium sesquicarbonate, etc. are formed, are respectively as shown in the diagram.

As evident from FIG. 1, it is understood that sodium sesquicarbonate is stably formed when the relative humidity is at least 40%. Here, FIG. 1 illustrates a case where the carbon dioxide gas concentration is 0.04 vol %, and also in a case where the carbon dioxide gas concentration is from 0.03 to 0.05 vol %, a region in which sodium sesquicarbonate is formed can be similarly obtained from experiments and thermodynamic calculations.

In the method of the present invention, the temperature at which sodium hydrogencarbonate crystal particles are left at rest is from 17 to 35° C. The temperature within this range is appropriate, which is close to the storage conditions. With respect to the upper limit temperature, if a measurement sample packaged at a low temperature is left at rest at a high temperature, the temperature of the sample will increase before water vapor is transmitted into the bag, and accordingly the relative humidity in the interior of the bag will temporarily decrease. Therefore, in the interior of the bag, a region of Wegscheider's salt or anhydrous sodium carbonate is achieved once, a period at a low humidity extends long in the still standing time in the test for evaluating the caking property, and the original still standing time in the sodium sesquicarbonate region tends to be short, whereby measurement reproducibility will be impaired. Similarly, with respect to the lower limit temperature, if a measurement sample packaged at a high temperature is left at rest at a low temperature, the relative humidity in the interior of the bag will temporarily increase along with the decrease in the temperature of the sample, thus leading to condensation, and such phenomenon departs from the practical caking phenomenon, and measurement reproducibility will be impaired, such being unfavorable. Considering the change in the relative humidity in the interior of the bag when a measurement sample is left at rest in e.g. a thermo-hygrostat, the temperature is more preferably from 20 to 29° C.

Further, with respect to the carbon dioxide gas concentration, evaluation can be carried out without any problem when it is within the above range of from 0.03 to 0.05%. Although the concentration varies depending upon the area, within the above concentration range, the air may be preferably selected, which provides the same practical storage environment.

Further, a relative humidity is from 40 to 95%. The upper limit of the relative humidity depends not only on the carbon dioxide concentration but also on the still standing temperature, but if it exceeds 95%, condensation is likely to occur at the time of still standing, such being unfavorable. It is more preferably at most 85%. On the other hand, if it is less than 40%, the relative humidity is closer to that for the Wegscheider's salt region, such being unfavorable. The still standing conditions can be selected by properly selecting the combination of the temperature, the carbon dioxide gas concentration and the relative humidity which are conditions under which the sodium hydrogencarbonate crystal particles are left at lest, within the range of the present invention.

Here, the measurement sample for the test for evaluating the caking property may be left at rest preferably in a thermo-hygrostat, and as a carbon dioxide gas is emitted from the measurement sample, it is required to pay attention so that the carbon dioxide gas in the interior of the thermo-hygrostat will not increase by properly maintaining ventilation.

For example, as specific preferred conditions under which the sodium hydrogencarbonate crystal particles are left at rest, the following conditions may be mentioned. Namely, the carbon dioxide gas concentration is 0.04 vol %, and the relative humidity is from 40 to 85% in a case where the temperature is at least 20° C. and less than 22° C., the relative humidity is from 40 to 86% in a case where the temperature is at least 22° C. and less than 24° C., the relative humidity is from 40 to 87% in a case where the temperature is at least 24° C. and less than 26° C., the relative humidity is from 40 to 89% in a case where the temperature is at least 26° C. and less than 28° C., the relative humidity is from 40 to 90% in a case where the temperature is at least 28° C. and less than 30° C., the relative humidity is from 40% to 91% in a case where the temperature is at least 30° C. and less than 32° C., the relative humidity is from 40% to 92% in a case where the temperature is at least 32° C. and less than 34° C., the relative humidity is from 40% to 93% in a case where the temperature is at least 34° C. and less than 35° C., and the relative humidity is from 40% to 95% in a case where the temperature is 35° C.

In the present invention, in a case where the sodium hydrogencarbonate crystal particles are left at rest, they are contained and hermetically sealed in a packaging material. The significance of packaging in the test for evaluating the caking property is that practical sodium hydrogencarbonate crystal particles are stored and delivered as packaged, that it is easy to quantitatively determine agglomerates of the sodium hydrogencarbonate crystal particles formed by caking, and that the shape and the formation amount are reproducible.

In the present invention, a sample for the test for evaluating the caking property is left at rest under high humidity conditions under which sodium sesquicarbonate is stable, but as the sample is packaged, transmission of the exterior humidity through the packaging material takes long. In order to shorten the time for the caking property evaluation test, the water vapor transmission rate of the packaging material is preferably high. The water vapor transmission rate of the packaging material is required to be at least 3 g/(m$^2$·24 h) at 40° C. with a relative humidity difference of 90%. If it is lower than this value, evaluation will take too long. It is particularly preferably at least 6 g/(m$^2$·24 h). With respect to the packaging material, there is no upper limit of the transmission rate so long as handling efficiency is achieved when the measurement sample is packaged.

As conditions at the time of hermetically sealing in the packaging material, the sample is packaged so that the bulk density is preferably from 0.2 to 0.7 time, particularly preferably from 0.3 to 0.6 time the true density. In such a manner, the sodium hydrogencarbonate crystal particles form agglomerates when they have a caking property, whereby the caking property can be quantitatively evaluated by measuring the mass proportion of the agglomerates.

With respect to the sodium hydrogencarbonate crystal particles hermetically sealed in a packaging material and left at rest for a predetermined time as mentioned above, the proportion of caking during still standing is evaluated as follows. Namely, the sodium hydrogencarbonate crystal particles after being left at rest are carefully taken out from the packaging bag so that the agglomerated state is not broken, and gently put on a wire netting such as a sieve with an opening larger than the crystal particles, and the portion of the caked agglomerates is weighed. The opening of the wire netting is suitably from 2 mm to 5 mm. It is considered that the larger the amount of the agglomerated portion, the higher the caking property. Then, the sieve on which the agglomerates are put, are horizontally rotated by a hand to draw a circle of from 10 to 30 cm so that the agglomerates slowly roll on the sieve, and agglomerates remaining after sieving for a certain time are weighed to quantitatively determine the amount of particles more strongly caked.

The time period of the caking property evaluation test is from two weeks to three months. The lower limit of the still standing time is preferably three weeks, and the upper limit is preferably two months, more preferably six weeks so as to increase the efficiency of the test by shortening the evaluation time. According to findings by experiments by the present inventors, caking which should be evaluated occurs when the water vapor transmission amount is at least 100 mass ppm per sodium hydrogencarbonate. For example, under such conditions that about 1 kg by mass is hermetically sealed in a small bag made of LDPE (low density polyethylene) comprising a packaging material having a water vapor transmission rate of at least 3 g/(m$^2$·24 h) (at 40° C. with a relative humidity difference of 90%) as stipulated in JIS K 7129 and left at stand at a temperature of from 17 to 35° C. at a relative humidity of from 40 to 95%, the above moisture absorption amount starts being achieved in about one to about three days. The water vapor transmission amount per sodium hydrogencarbonate crystal particles as a measurement sample is preferably at least 100 mass ppm, more preferably 500 mass ppm, furthermore preferably at least 1,000 mass ppm. As a method of measuring the moisture content, the change of the composition of the sodium hydrogencarbonate crystal particles between before and after the caking property evaluation test may be measured by anhydrous methanol extraction method and TGA method as described hereinafter. For example, when the amount of anhydrous sodium carbonate is reduced after the caking property evaluation test as compared with before the caking property evaluation test and only sodium carbonate monohydrate is increased, the amount corresponds to the water vapor transmission amount.

EXAMPLES

Now, the present invention will be described in further detail with reference to Examples, but it should be understood that the present invention is by no means restricted to such specific Examples.

Example 1

Sodium hydrogencarbonate crystal particles having various surface compositions were produced under the following conditions.

First, 20 m³ of an aqueous sodium hydroxide solution having a concentration of 20 mass % was put in a tank (50 m³) provided with a stirrer, and the temperature was raised to 80° C. In such a state, a carbon dioxide gas at a concentration of 100 vol % was blown for 5 hours in a flow rate of 10 m³ per minute as calculated in a standard state for reaction crystallization. In the crystallization step, first, sodium hydroxide is reacted with carbon dioxide to form sodium carbonate. So far, no crystals are precipitated, Then, carbon dioxide and sodium carbonate are reacted to form sodium hydrogencarbonate. Here, as the solubility of sodium hydrogencarbonate is low, crystals of sodium hydrogencarbonate are precipitated. Then, by decreasing the temperature to 40° C. while the carbon dioxide gas is continuously blown, the sodium hydrogencarbonate crystal particles were further precipitated. The obtained slurry was subjected to a centrifugal separator to separate the mother liquor, thereby to obtain wet sodium hydrogencarbonate crystal particles.

The wet sodium hydrogencarbonate crystal particles were brought into contact with a drying gas consisting of a carbon dioxide gas-containing air in a parallel flow manner under drying conditions (temperature, relative humidity, carbon dioxide concentration) as shown in the following Table 2 using a rotary dryer (manufactured by MASUNO SEISAKUSHO LTD.) so that the sodium hydrogencarbonate crystal particles were dried and part of the sodium hydrogencarbonate crystal particles were baked to form anhydrous sodium carbonate. Immediately after that, the sodium hydrogencarbonate crystal particles were cooled to 30° C. by a cylindrical cooling device provided with a paddled mixer and an indirect cooling jacket. For cooling, a dry air having a dew point of −40° C. was heated to 20° C. and injected to the cooling device, and a gas accompanying the crystal particles was purged.

Then, the obtained sodium hydrogencarbonate crystal particles were subjected to sieving by using a shaking sieve provided with an ultrasonic oscillator and provided with a mesh with an opening of 0.25 mm, and particles having an average particle size of 0.1 mm, which passed through a sieve were obtained. The sodium hydrogencarbonate crystal particles were employed as a sample to be used for the caking property evaluation test (hereinafter referred to as the present sample). This sample was used for the following evaluation regarding the caking.

Now, a test method for evaluating the caking property of the present sample is specifically described below. 1 kg of the present sample was weighed, put in a bag made of a LLDPE (linear low density polyethylene) film having a thickness of 120 μm and hermetically sealed by heat sealing. This packaging bag had dimensions of 200 mm in width and 300 mm in length, and had a vapor transmission of 6.0 g/m² day at 40° C. as stipulated in JIS K 7129. This bag was left at rest for one month in an atmosphere at 25° C. at a relative humidity of 85%. After still standing, the bag was carefully opened so that the present sample would not disintegrate, and the present sample was delicately poured on a standard sieve (hereinafter referred to simply as "sieve") having an inner diameter of 200 mm, having a wire netting with an opening of 3 mm set thereto, as stipulated in JIS Z 8801-1. The mass of the product and the sieve was weighed to measure the mass of the present sample on the sieve to determine the mass ratio to the present sample at the time of packaging. The ratio was defined as the "amount of particles weakly caked". Here, the product which was caked as a whole at the time of opening is considered to have a ratio of 100%. Then, the sieve on which the present sample was put was tapped with a hand for three seconds, and the mass of the present sample and the sieve was weighed to measure the mass of the present sample on the sieve, to determine the mass ratio to the present sample at the time of packaging. This ratio was defined as the "amount of particles moderately caked". Further, the sieve on which the present sample was put was tapped with a hand for 10 seconds, and the mass of the present sample and the sieve was weighed to measure the mass of the present sample put on the sieve, to determine the mass ratio to the present sample at the time of packaging. This ratio was defined as the "amount of particles strongly caked". The "amount of particles strongly caked" was defined as the mass of portion in the form of hard agglomerates, and this ratio being high means particles being strongly caked.

The average particle size of the present sample before the caking property evaluation test depends on the sieving method. The average particle size is an average particle size based on the mass, and is defined as the 50% particle size in the cumulative particle size distribution based on the mass obtained by a sieving method. Specifically, measurement is carried out by means of a Ro-Tap shaker and a sieving method (hereinafter referred to simply as a sieving method) as stipulated in JIS Z 8801-1. The opening of the sieve used was 355 μm, 250 μm, 180 μm, 150 μm, 106 μm, 75 μm or 45 μm.

Further, for measurement of anhydrous sodium carbonate, sodium carbonate monohydrate, Wegscheider's salt and sodium sesquicarbonate in the present sample, the total amount of anhydrous sodium carbonate, sodium carbonate monohydrate and sodium sesquicarbonate in the present sample was quantitatively determinate by anhydrous methanol extraction method as described hereinafter, and the content of sodium carbonate monohydrate or Wegscheider's salt and the content of sodium sesquicarbonate in the present sample were determined by TGA method as described hereinafter. From the measurement results by these methods, the respective amounts of anhydrous sodium carbonate, sodium carbonate monohydrate, Wegscheider's salt and sodium sesquicarbonate in the present sample were determined.

Now, the anhydrous methanol extraction method will be described below.

In the present invention, the "anhydrous methanol extraction method" means a method wherein the total amount of anhydrous sodium carbonate, sodium carbonate monohydrate and sodium sesquicarbonate in the present sample is analyzed by extracting the respective components from the sodium hydrogencarbonate crystal particles with anhydrous methanol, followed by neutralization titration. Specifically, 5 g of the present sample is weighed, which is put in 100 mL of anhydrous methanol, followed by shaking for 30 minutes. Then, titration is carried out with 0.1 N hydrochloric acid with phenolphthalein as an indicator to quantatively determine the total amount of anhydrous sodium carbonate, sodium carbonate monohydrate and sodium sesquicarbonate in the present sample. Here, the 0.1 N hydrochloric acid is prepared by diluting a 35 mass % hydrochloric acid aqueous solution with anhydrous methanol so as to reduce inclusion of moisture as far as possible. Or, a methanol solution of hydrogen chloride may be used. Here, Wegscheider's salt is substantially insoluble in anhydrous methanol and is thereby not measured by the anhydrous methanol extraction method.

Now, the TGA method will be explained below. In the present invention, the "TGA method" is a method of measuring the contents of sodium carbonate monohydrate, Wegscheider's salt and sodium sesquicarbonate in the sodium hydrogencarbonate crystal particles, and is a method of measuring the mass reduction of the respective components by thermolysis at specific two levels of temperatures by a thermogravimetric analyzer and analyzing the content of a sodium carbonate monohydrate or Wegscheider's salt component and the content of a sodium sesquicarbonate component from the difference in the weight reduction profile between the two levels of temperatures.

A certain amount of the present sample as a sample to be measured is put in a sample cell, and the present sample is heated at a constant temperature in a drying gas such as a nitrogen gas, which will not react with sodium hydrogencarbonate, anhydrous sodium carbonate, sodium carbonate monohydrate, Wegscheider's salt nor sodium sesquicarbonate, and the mass reduction when sodium carbonate monohydrate, Wegscheider's salt and sodium sesquicarbonate are decomposed into anhydrous sodium carbonate is precisely measured.

Specifically, a predetermined amount of the present sample is weighed in a sample cell, and measurement is carried out at a predetermined temperature by an isothermal method using a nitrogen gas containing substantially no moisture by means of a thermogravimetric analyzer. Here, the measurement can be carried out utilizing the facts newly found by the present inventors that sodium hydrogencarbonate is more thermally stable and is less likely to decompose than sodium carbonate monohydrate, Wegscheider's salt and sodium sesquicarbonate and that sodium sesquicarbonate is more stable under heated conditions than sodium carbonate monohydrate and Wegscheider's salt. Namely, employing two levels of predetermined measurement temperatures, and from the difference, the content of sodium carbonate monohydrate or Wegscheider's salt and the content of sodium sesquicarbonate can be accurately determined. For the lower temperature (hereinafter sometimes referred to as a first temperature) between the two levels of the temperatures, such a temperature is selected that decomposition of sodium carbonate monohydrate or Wegscheider's salt is substantially completed in a certain time and decomposition of sodium sesquicarbonate does not substantially start. Further, for the higher temperature (hereinafter sometimes referred to as a second temperature), such a temperature is selected that decomposition of sodium carbonate monohydrate, Wegscheider's salt and sesquicarbonate is substantially completed in a certain time. The temperature and the time vary in accordance with the amount of the sample for measurement, the structure of the measuring apparatus, the structure of the sample container, etc.

For example, the first temperature and time are such temperature and time that decomposition of sodium carbonate monohydrate and Wegscheider's salt into anhydrous sodium carbonate is substantially completed and decomposition of sodium sesquicarbonate does not substantially start, and it is preferred that the temperature is selected from 45 to 57° C. and the time is selected from 40 to 60 minutes. The first temperature is particularly preferably from 51 to 55° C., and the time is preferably from 45 to 55 minutes. Further, the second temperature and time are such temperature and time that decomposition of sodium carbonate monohydrate, Wegscheider's salt and sodium sesquicarbonate is substantially completed, and it is preferred that the temperature is selected from 58 to 70° C. and the time is selected from 40 to 60 minutes. The second temperature is particularly preferably from 61 to 65° C., and the time is preferably from 45 to 55 minutes. The difference between the first and the second temperatures is preferably from 5 to 15° C., particularly preferably from 7 to 15° C.

The absolute value of sodium carbonate monohydrate, the absolute value of Wegscheider's salt and the absolute value of sodium sesquicarbonate are determined by a standard addition method of quantitaively analyzing the aimed present sample based on values obtained by measuring a sample comprising a predetermined amount of fine particles of each component mixed with sodium hydrogencarbonate crystal particles containing substantially no sodium carbonate monohydrate, Wegscheider's salt nor sodium sesquicarbonate.

In the present Example, thermo-gravimetric/differential thermal analyzer TG/DTA6200 manufactured by SII Nanotechnology Inc. was used. In this measurement, the lower temperature was 53° C., the higher temperature was 63° C., and the weight reduction after a lapse of 50 minutes was measured at each temperature. The amount of the present sample used for the measurement was 60 mg. In the meantime, to correct the weight reduction by decomposition of sodium hydrogencarbonate itself in a certain time at each of the two levels of temperatures, measurement was separately carried out with respect to only sodium hydrogencarbonate containing substantially no sodium carbonate monohydrate, Wegscheider's salt and sodium sesquicarbonate, and the obtained weight reduction is subtracted from each measured value as a base line. The weight reduction at 53° C. after a lapse of 50 minutes corresponds to the content of sodium carbonate monohydrate or Wegscheider's salt, and the value obtained by subtracting the weight reduction at 53° C. after a lapse of 50 minutes from the weight reduction at 63° C. after a lapse of 50 minutes corresponds to the content of sodium sesquicarbonate. Sodium carbonate monohydrate and Wegscheider's salt in Table 2 were distinguished by judging which of the region of sodium carbonate monohydrate or the region of Wegscheider's salt was achieved in a phase equilibrium diagram based on conditions of the temperature, the relative humidity and the carbon dioxide gas concentration in the atmosphere under which sample to be subjected to measurement was treated or stored. In a case of not depending upon the phase equilibrium diagram, crystals of anhydrous sodium carbonate are stored in a long period of time under the atmosphere, and the change of the crystal is examined by structure analysis of the crystals by X-ray diffraction. Here, if the sample to be subjected to measurement by the TGA method is left to stand at room temperature for a long period of time, it will absorb moisture and thereby form Wegscheider's salt, and accordingly analysis should be carried out quickly after sampling.

The value obtained by subtracting the contents of sodium carbonate monohydrate and sodium sesquicarbonate determined by the TGA method from the content corresponding to the total amount of anhydrous sodium carbonate, sodium carbonate monohydrate and sodium sesquicarbonate determined by the anhydrous methanol extraction method, is the content of anhydrous sodium carbonate. If there is no mass reduction by pyrolysis of sodium carbonate monohydrate, Wegscheider's salt and sodium sesquicarbonate in the TGA method, the value determined by the anhydrous methanol extraction method all corresponds to the content of anhydrous sodium carbonate. The sodium hydrogencarbonate crystal particles before the caking property evaluation test used in this Example correspond to the above case, and the value obtained by the anhydrous methanol extraction method corresponds to the content of anhydrous sodium carbonate, and no sodium carbonate monohydrate, Wegscheider's salt nor sodium sesquicarbonate is contained.

In the following Table 2, results of the test for evaluating the caking property of the present sample containing anhydrous sodium carbonate and containing no sodium carbonate monohydrate, Wegscheider's salt nor sodium sesquicarbonate are shown. Each content shown in Table 2 is calculated as anhydrous sodium carbonate. However, the mass of the sodium hydrogencarbonate crystal particles as the base of the content of each component is the mass of the crystal particles themselves and is not calculated as anhydrous sodium carbonate. With respect to the composition after the evaluation test, sodium carbonate monohydrate and Wegscheider's salt determined by the TGA method can be distinguished by FIG. 1. Namely, under the test conditions, no sodium carbonate monohydrate will be formed. With respect to formation of Wegscheider's salt, the present inventors estimate as follows. First, by presence of anhydrous sodium carbonate, the relative humidity in the interior of the bag in which the sodium hydrogencarbonate crystal particles are packaged was decreased, and Wegscheider's salt was formed first. Then, after anhydrous sodium carbonate disappeared, the relative humidity in the interior of the bag was increased, whereby sodium sesquicarbonate was formed. The change in the relative humidity was confirmed by providing a hydrometer in the interior of the bag. With respect to Table 3 also, Wegscheider's salt was formed similarly.

It is evident from Table 2 that the larger the amount of anhydrous sodium carbonate before the caking property evaluation test, the larger the respective amounts of Wegscheider's salt and sodium sesquicarbonate converted after the caking property evaluation test. Further, it is indicated that the amount of particles strongly caked is largest in the sample No. 3 having a high content of sodium sesquicarbonate after the caking property evaluation test. Thus, the difference in the caking property among sodium hydrogencarbonate crystal particle differing in the surface composition is clearly indicated, and it is found that the evaluation method shown in Example 1 is excellent as a method for evaluating the caking property.

TABLE 2

|  |  | Sample No. | | |
|---|---|---|---|---|
|  |  | 1 | 2 | 3 |
| Temperature among drying conditions (° C.) | | 80 | 84 | 90 |
| Relative humidity among drying conditions (%) | | 16 | 13 | 7 |
| Carbon dioxide concentration in gas among drying conditions (vol %) | | 5 | 6 | 10 |
| Average particle size (μm) | | 98 | 101 | 97 |
| Bulk density at the time of packaging/true density of sodium hydrogenearbonate | | 0.473 | 0.485 | 0.480 |
| Content of anhydrous sodium carbonate (mass %) | Before evaluation test | 0.16 | 0.27 | 0.42 |
| | After evaluation test | 0.00 | 0.00 | 0.00 |
| Content of sodium carbonate monohydrate (mass %) | Before evaluation test | 0.00 | 0.00 | 0.00 |
| | After evaluation test | 0.00 | 0.00 | 0.00 |
| Content of Wegscheider's salt (mass %) | Before evaluation test | 0.00 | 0.00 | 0.00 |
| | After evaluation test | 0.06 | 0.12 | 0.23 |
| Content of sodium sesquicarbonate (mass %) | Before evaluation test | 0.00 | 0.00 | 0.00 |
| | After evaluation test | 0.10 | 0.15 | 0.19 |
| Proportion of sodium sesquicarbonate to total amount of anhydrous sodium carbonate, sodium carbonate monohydrate, Wegscheider's salt and sodium sesquicarbonate after the caking property evaluation test | | 0.63 | 0.56 | 0.45 |
| Amount of particles weakly caked (mass %) | | 82 | 87 | 96 |
| Amount of particles moderately caked (mass %) | | 32 | 51 | 90 |

TABLE 2-continued

|  | Sample No. | | |
|---|---|---|---|
|  | 1 | 2 | 3 |
| Amount of particles strongly caked (mass %) | 1 | 11 | 69 |

Example 2

Comparative Example

Using each sample used in Example 1, the test for evaluating the caking property was carried out except that the storage was conducted at a temperature of 40° C. at a relative humidity of 75% for a still standing time of one week. The results are shown in Table 3. The concentration (mass %) of each component shown in Table 3 is calculated as anhydrous sodium carbonate. The time over which the sample was left at rest at a temperature of 40° C. at a relative humidity of 75% was one week, because if the time is two weeks, decomposition of the sodium hydrogencarbonate crystal particles tends to be significant, which is different from the practical storage state.

As shown in Table 3, when the amount of anhydrous sodium carbonate before the caking property evaluation test increases, the amount of Wegscheider's salt after the caking property evaluation test increases, but the amount of conversion into sodium sesquicarbonate does not increase. Further, the degree of the amount of particles strongly caked is not so different among the samples Nos. 1 to 3. Accordingly, since conversion into sodium sesquicarbonate is insufficient, the difference in the caking property among sodium hydrogencarbonate crystal particles differing in the surface composition is not obvious, and it is understood that this example is inappropriate as a method for evaluating the caking property.

Here, the reason why the conversion of the composition into sodium sesquicarbonate is small is estimated as follows. Namely, the sample packaged at room temperature was put in a thermo-hygrostat at 40° C. as a still standing condition and as a result, the relative humidity in the interior of the bag decreased; and a very small amount of the sodium hydrogencarbonate crystal particles are decomposed thereby to increase the carbon dioxide concentration in the interior of the bag and as a result, the environment for storing the sodium hydrogencarbonate crystal particles corresponded to the Wegscheider's salt region. This will be described in detail below. First, the conditions under which the sodium hydrogencarbonate crystal particles were packaged in the LLDPE bag were a temperature of 25° C. and a relative humidity of 52%. This corresponds to an absolute humidity of 12.35 mmHg. When the bag is left at rest in a thermo-hygrostat, the water vapor would not immediately be transmitted into the bag, and thus only by the temperature of 40° C., the relative humidity decreases to 22% as the saturated humidity at 40° C. is 55.33 mmHg. Therefore, even when the region of sodium sesquicarbonate at a relative humidity of 75% is achieved in the thermo-hygrostat, the region of Wegscheider's salt at a relative humidity of 22% is achieved in the interior of the packaging bag, whereby the conversion into sodium sesquicarbonate tends to be slow.

Further, at a temperature of 40° C., sodium hydrogencarbonate is likely to be decomposed, whereby the carbon dioxide concentration in the interior of the packaging bag will increase. Even by decomposition at a level undetectable by the above-described anhydrous methanol extraction method, e.g. at a level of 0.001 mass %, the carbon dioxide concentration in the interior of the packaging bag will increase by so much as from 2,000 to 3,000 ppm, and the regions of Wegscheider's salt and sodium hydrogencarbonate are greatly extended to a high temperature and high humidity direction. This is also a cause to delay the conversion into sodium sesquicarbonate.

TABLE 3

|  |  | Sample No. | | |
| --- | --- | --- | --- | --- |
|  |  | 1 | 2 | 3 |
| Temperature among drying conditions (° C.) | | 80 | 84 | 90 |
| Relative humidity among drying conditions (%) | | 16 | 13 | 7 |
| Carbon dioxide concentration in gas among drying conditions (vol %) | | 5 | 6 | 10 |
| Average particle size (μm) | | 98 | 101 | 97 |
| Bulk density at the time of packaging/true density of sodium hydrogencarbonate | | 0.480 | 0.478 | 0.470 |
| Content of anhydrous sodium carbonate (mass %) | Before evaluation test | 0.16 | 0.27 | 0.42 |
|  | After evaluation test | 0.00 | 0.09 | 0.22 |
| Content of sodium carbonate monohydrate (mass %) | Before evaluation test | 0.00 | 0.00 | 0.00 |
|  | After evaluation test | 0.00 | 0.00 | 0.00 |
| Content of Wegscheider's salt (mass %) | Before evaluation test | 0.00 | 0.00 | 0.00 |
|  | After evaluation test | 0.06 | 0.07 | 0.10 |
| Content of sodium sesquicarbonate (mass %) | Before evaluation test | 0.00 | 0.00 | 0.00 |
|  | After evaluation test | 0.10 | 0.11 | 0.10 |
| Proportion of sodium sesquicarbonate to total amount of anhydrous sodium carbonate, sodium carbonate monohydrate, Wegscheider's salt and sodium sesquicarbonate after the caking property evaluation test | | 0.63 | 0.41 | 0.24 |
| Amount of particles weakly caked (mass %) | | 27 | 55 | 79 |
| Amount of particles moderately caked (mass %) | | 0 | 10 | 42 |
| Amount of particles strongly caked (mass %) | | 0 | 0 | 9 |

INDUSTRIAL APPLICABILITY

According to the present invention, with respect to evaluation of the caking tendency resulting from conversion of the surface composition on sodium hydrogencarbonate crystal particles into sodium sesquicarbonate, which has been poorly reproducible, data can be obtained with high reproducibility, quantitatively with high versatility.

The entire disclosures of Japanese Patent Application No. 2004-194540 filed on Jun. 30, 2004 and Japanese Patent Application No. 2004-250749 filed on Aug. 30, 2004 including specifications, claims, drawings and summaries are incorporated herein by reference in their entireties.

What is claimed is:

1. A method for evaluating the caking property of sodium hydrogencarbonate crystal particles, comprising:
hermetically sealing the sodium hydrogencarbonate crystal particles in a packaging material having a water vapor transmission rate of at least 3 g/(m$^2$·24 h) at 40° C. with a relative humidity difference of 90% as stipulated in JIS K7129,
resting the hermetically sealed sodium hydrogencarbonate crystal particles at a temperature of from 17 to 35° C. at a carbon dioxide gas concentration of from 0.03 to 0.05 vol % at a relative humidity of from 40 to 95% for from 2 weeks to 3 months, and
measuring a content of Wegscheider's salt or a content of sodium sesquicarbonate in the rested sodium hydrogencarbonate crystal particles, thereby evaluating the caking property of the sodium hydrogencarbonate particles.

2. The method for evaluating the caking property of sodium hydrogencarbonate crystal particles according to claim 1, wherein the sodium hydrogencarbonate crystal particles have at least one member selected from the group consisting of anhydrous sodium carbonate, sodium carbonate monohydrate, Wegscheider's salt and sodium sesquicarbonate on their surface.

3. The method for evaluating the caking property of sodium hydrogencarbonate crystal particles according to claim 1, wherein the sodium hydrogencarbonate crystal particles are hermetically sealed in the packaging material so that the bulk density is from 0.2 to 0.7 time the true density, and rested.

4. The method for evaluating the caking property of sodium hydrogencarbonate crystal particles according to claim 1, wherein the temperature at which the crystal particles are rested is from 20 to 29° C.

5. The method for evaluating the caking property of sodium hydrogencarbonate crystal particles according to claim 1, wherein the time period over which the crystal particles are rested is from 3 weeks to 2 months.

6. The method according to claim 1, wherein the packaging material has a water vapor transmission rate of at least 6 g/(m$^2$·24 h).

7. The method according to claim 1, wherein the sodium hydrogencarbonate crystal particles are hermetically sealed in the packaging material so that the bulk density is from 0.3 to 0.6 time the true density.

8. The method according to claim 1, wherein the evaluating includes sieving the rested sodium hydrogencarbonate particles on a sieve having openings of 2-5 mm in diameter.

9. The method according to claim 8, wherein the evaluating further comprises:
collecting and weighing agglomerated sodium hydrogencarbonate particles that do not pass through the sieve.

10. The method according to claim 1, wherein the sodium hydrogencarbonate crystal particles have an average particles size of 70-300 μm.

11. The method according to claim 1, wherein the resting is carried out at a temperature of from 20 to 29° C.

12. The method according to claim 1, wherein the relative humidity is from 40 to 85% and the temperature is at least 20° C. and less than 22° C.

13. The method according to claim 1, wherein the relative humidity is from 40 to 86% and the temperature is from at least 22° C. to less than 24° C.

14. The method according to claim 1, wherein the relative humidity is from 40 to 87% and the temperature is at least 24° C. and less than 26° C.

15. The method according to claim 1, wherein the relative humidity is from 40 to 89% and the temperature is at least 26° C. and less than 28° C.

16. The method according to claim 1, wherein the relative humidity is from 40 to 90% and the temperature is at least 28° C. and less than 30° C.

17. The method according to claim 1, wherein the relative humidity is from 40 to 91% and the temperature is at least 30° C. and less than 32° C.

18. The method according to claim 1, wherein the relative humidity is from 40 to 92% and the temperature is at least 32° C. and less than 34° C.

19. The method according to claim 1, wherein the relative humidity is from 40 to 93% and the temperature is at least 34° C. and less than 35° C.

20. The method for evaluating the caking property of sodium hydrogencarbonate crystal particles according to claim 1, wherein the step of measuring includes steps of:
preparing a sample from the sodium hydrogencarbonate particles rested in the step of keeping;
heating the sample under a condition where decomposition of sodium carbonate monohydrate and the Wegscheider's salt is substantially completed and decomposition of sodium sesquicarbonate does not substantially start,
measuring a weight reduction of the sample after the step of heating; and
measuring the content of the Wegscheider's salt based on the reduced weight and a phase equilibrium diagram.

21. The method for evaluating the caking property of a sodium hydrogencarbonate crystal particles according to claim 1, wherein the step of measuring includes steps of:
preparing a sample from the sodium hydrogencarbonate crystal particles rested in the step of keeping;
heating the sample under a first condition where decomposition of sodium carbonate monohydrate and the Wegscheider's salt is substantially completed and decomposition of sodium sesquicarbonate does not substantially start,
heating the sample under a second condition where decomposition of sodium carbonate monohydrate, the Wegscheider's salt, and sodium sesquicarbonate are substantially completed, and
measuring the content of the sodium sesquicarbonate in accordance with a weight reduction of the sample after the step of heating.

22. The method for evaluating the caking property of a sodium hydrogencarbonate crystal particles according to claim 1, comprising measuring the content of Wegscheider's salt in the rested sodium hydrogencarbonate crystal particles, thereby evaluating the caking property of the sodium hydrogencarbonate particles.

23. The method for evaluating the caking property of a sodium hydrogencarbonate crystal particles according to claim 1, comprising measuring the content of sodium sesquicarbonate in the rested sodium hydrogencarbonate crystal particles, thereby evaluating the caking property of the sodium hydrogencarbonate particles.

* * * * *